United States Patent [19]

Ikeda

[11] Patent Number: 5,168,153
[45] Date of Patent: Dec. 1, 1992

[54] INTEGRATOR AND IMAGE READ DEVICE
[75] Inventor: Chikaho Ikeda, Kanagawa, Japan
[73] Assignee: Fuji Xerox Co., Ltd., Tokyo, Japan
[21] Appl. No.: 770,438
[22] Filed: Oct. 3, 1991
[30] Foreign Application Priority Data
  Nov. 1, 1990 [JP] Japan .................................. 2-293675
[51] Int. Cl.⁵ .............................................. H01J 40/14
[52] U.S. Cl. ............................. 250/214 A; 250/214 C; 307/491; 307/311
[58] Field of Search ........... 250/214 A, 214 R, 214 C; 307/311, 491, 494; 330/107, 294; 328/128

[56]        References Cited
        U.S. PATENT DOCUMENTS
  4,602,171  7/1986  Brisson et al. ...................... 307/491
  4,651,032  3/1987  Nobuta ................................ 307/491
  4,889,985  12/1989 Allsop et al. ................... 250/214 A FOREIGN PATENT DOCUMENTS
  1340308  9/1972  United Kingdom .

Primary Examiner—David C. Nelms
Assistant Examiner—K. Shami
Attorney, Agent, or Firm—Finnegan, Henderson, Farabow, Garrett and Dunner

[57]        ABSTRACT

An integrator having a first circuit including an integrating capacitor and a feedback resistor, both being connected in parallel to each other in a negative feedback loop of the first circuit, and a second circuit, connected to an output side of the first circuit, for compensating for a leak by the feedback resistor. The first circuit operates as an integrator in high frequencies, and as a current-voltage converter in low frequencies. Further, the second circuit compensates for the leak by the feedback resistor, thereby to produce a value indicative of the result of integrating an input current.

6 Claims, 4 Drawing Sheets

INTEGRATOR AND IMAGE READ DEVICE

BACKGROUND OF THE INVENTION

1. Field of the Invention

The present invention relates to an integrator adaptable for a current detector, such as a sensor with a current mode output, and relates to an image read device using the integrator.

2. Discussion of the Related Art

Conventionally, an image read device used as an image reader for reading an image on a document original in a facsimile, for example, may be expressed by a simple equivalent circuit shown in FIG. 8. As shown in FIG. 8, light containing image information of the original illuminates a photocell 51 consisting of a constant current source 81 operating according to an amount of light, and a photo diode 82, both being coupled in parallel to each other. The photocell 51 discharges an amount of charge which depends on an amount of incident light. A voltage produced across the photodiode capacitance 82 is picked up through a buffer 83. The voltages thus picked up are multiplexed into time-sequential data of the image signal.

The image read device suffers from such a problem that the wires from the photocells 51 to the buffers 83 are capacitively coupled, providing inexact image data.

To solve the problem, an approach as shown in FIG. 5 has been made. As shown in FIG. 5, one end of each photocell 51 is connected to a common wire 53. The current flowing into the common wire is converted into a voltage by an integrator 1. This approach successfully can reduce the capacitive coupling.

However, a basic integrator 200 as shown in FIG. 9 used in the above approach involves the following problem. In a negative feedback portion of the integrator 200, an analog switch 202 constructed with a CMOS element is provided for resetting an integrating capacitor 201. The quantity of the charge caused by a drive pulse from the analog switch 202 is approximately 10 pC. The quantity of charge leaked from the photodiode forming a sensor 100 coupled with the integrator 200 is 0.1 pC per pixel when it is used under general conditions. Accordingly, most of the output signal of the integrator 200 consists almost all of the noise from the analog switch 202. Additionally, in a state where the analog switch 202 for resetting the integrating capacitor 201 is closed, an operational amplifier 203 tends to oscillate. To avoid this, a response speed of the operational amplifier 203 must be considerably decreased.

The leak charge from the analog switch 202 may be reduced by reducing an area of the MOS element. However, if the area is reduced, on-resistance of the MOS element is increased. With the increased on-resistance, a long time is taken for resetting the integrating capacitor 201. This acts as a negative factor in the high speed operation of the device. Providing the analog switch 201 as an active element in the first stage of the circuit possibly amplifies the noise generated in the switch itself.

In order to solve the above problems, a circuit as shown in FIG. 10 has been developed and practically used. In the circuit, the integrator 200 follows a current-voltage converter 300 including an operational amplifier 301 and a negative feedback a resistor 302. The circuit converts an input current (sensor current) based on a minute quantity of charge discharged from the sensor 100, into a voltage by the current-voltage converter 300. In the circuit thus constructed, the current-voltage converter 300 has theoretically a low output voltage converter. If a value of a resistor 400 inserted between the current-voltage converter 300 and the integrator 200 is properly varied, the current many times as large as the current from the sensor 100 may be fed to the succeeding integrator 200. As a consequence, the leak charge from the logic of the analog switch 202 can be reduced relatively.

The preceding current-voltage converter 300 uses the resistor 302 for the negative feedback. If a capacitive element, such as the sensor 100 containing a sensor output capacitor 101, is directly coupled with the current-voltage converter 300, the phase of the voltage fed back delays, so that the current-voltage converter will oscillate. To suppress the oscillation, a resistor 500 must be inserted between the sensor 100 and the current-voltage converter 300. Accordingly, a read speed of the circuit is limited by a CR low-pass filter consisting of the sensor output capacitor 101 and the resistor 500.

The response speed of the current-voltage converter 300, when operating at a high speed, is determined by the through-rate of the operational amplifier 301. The output voltage of the amplifier 301 fails to follow the input current (sensor current).

A problem exists, which is common in both the circuits of FIGS. 9 and 10. The problem arises from the fact that the on/off speed of the analog switch 201 is slow, that is, several tens to several hundreds nsec. The slow switching speed consumes excessive time in a high speed operation, and possibly introduces an error.

SUMMARY OF THE INVENTION

The present invention has been made in view of the above circumstances and has an object to provide an integrator which can detect a minute current in a high speed image-read operation.

In order to accomplish the above object, an integrator according to the present invention comprises: a first circuit including an integrating capacitor and a feedback resistor, both being connected in parallel to each other in a negative feedback loop of the first circuit; and a second circuit, connected to an output side of the first circuit, for compensating for a leak by the feedback resistor.

The first circuit operates as an integrator in high frequencies, and as a current-voltage converter in low frequencies. Further, the second circuit compensates for the leak by the feedback resistor, thereby to produce a value indicative of the result of integrating an input current.

DETAILED DESCRIPTION OF THE PREFERRED EMBODIMENTS

Preferred embodiments will be described in detail with reference to the accompanying drawings.

Figure 1:
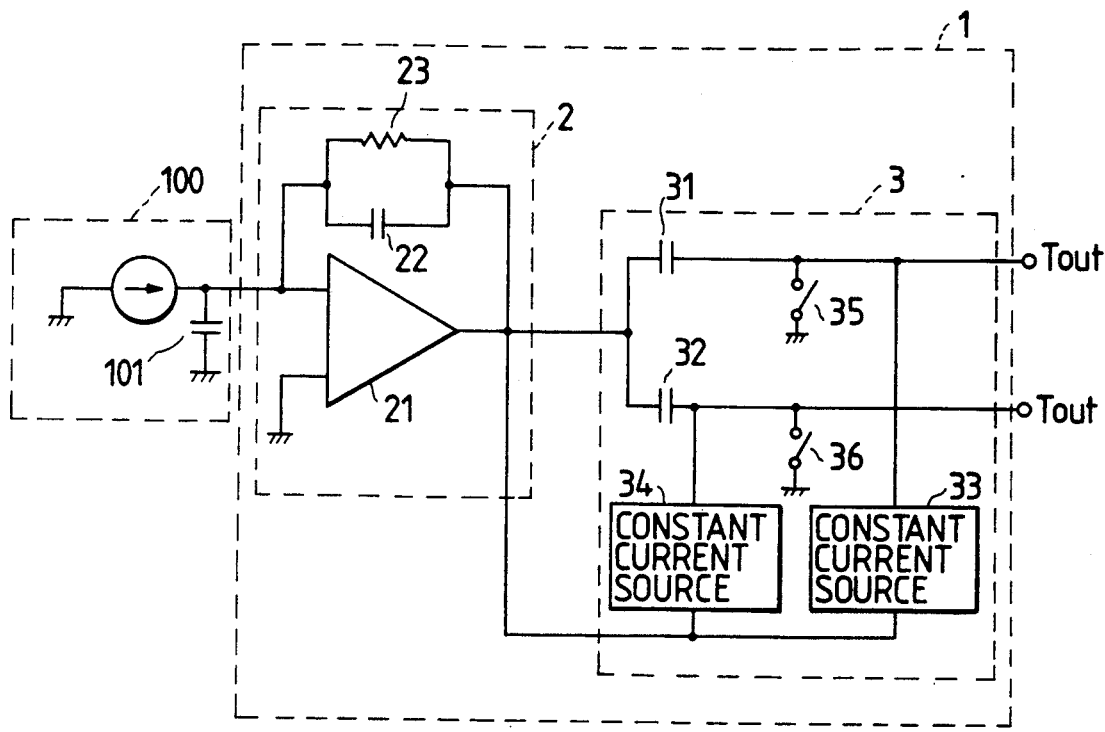
FIG. 1 is an equivalent circuit diagram showing an integrator according to an embodiment of the invention.

In FIG. 1, an integrator 1 according to an embodiment of the invention comprises a first circuit 2 and a second circuit 3. The first circuit 2 operates as an integrator in high frequencies, and as a current-voltage converter in low frequencies. The first circuit 2 includes an operational amplifier 21 of which the feedback circuit consists of a parallel circuit of an integrating capacitor 22 and a feedback resistor 23. The operational amplifier 21 is earthed at its non-inverting input terminal, and connected at its inverting input terminal to a sensor 100. In the embodiment, a JFET is used for the input portion of the operational amplifier 21 to prevent a generation of current noise.

The second circuit 3 includes a couple of capacitors 31 and 32 of which the first ends are connected to the output terminal of the first circuit 2, a couple of constant current sources 33 and 34 which are inserted between the second ends of o the capacitors 31 and 32 and the output terminal of the first circuit 2, and a couple of reset switches 35 and 36 respectively connected to the capacitors 31 and 32. Output terminals Tout are respectively formed at the second ends of the capacitors 31 and 32. The capacitor 31, the constant current source 33, and the reset switch 35 make up a first compensating circuit. The capacitor 32, the constant current source 34, and the reset switch 36 make up a second compensating circuit. Thus, in the integrator, the two compensating circuits are branched from the output of the first circuit 2.

Figure 2:
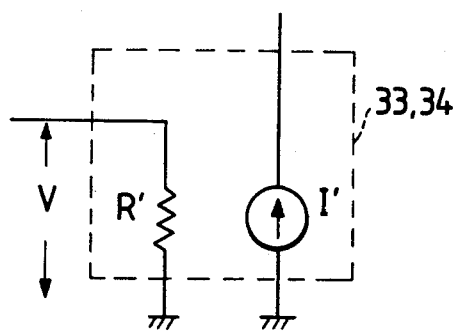
FIG. 2 is an equivalent circuit diagram showing each constant current source used in the circuit of FIG. 1.
Figure 3:
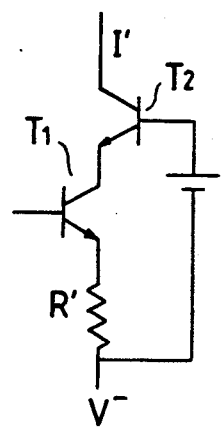
FIG. 3 is a more specific equivalent circuit diagram of the constant current source of FIG. 2.

An equivalent circuit of each of the constant current sources 33 and 34 is as shown in FIG. 2. In FIG. 2, a current I' substantially proportional to an input voltage V (output voltage of the first circuit 2) is outputted. Specifically, as shown in FIG. 3, the constant current source is constituted by two NPN transistors $T_1$ and $T_2$, and a resistor R'. The construction is suitable for the monolithic integration of the circuit. The constant current source is based on a cascade connection that the emitter of the transistor $T_1$ and the collector of the transistor $T_2$ are connected to each other, and that the base of the transistor $T_2$ is set at a fixed potential, so as to prevent degradation of the frequency characteristic. In the constant current source thus constructed, the voltage between the base and collector of the transistor $T_1$ is a result of the subtraction of an offset voltage (approximately 0.6 V) from voltage E where the voltage applied to the base of the transistor $T_1$ is $V^{31}$ +E. A current I' flows the collectoremitter path of the transistor $T_1$. The current I' is a quotient of dividing the voltage (E−0.6 V) by the resistance of the resistor R'. The current I' is substantially proportional to the voltage E.

Figure 4:
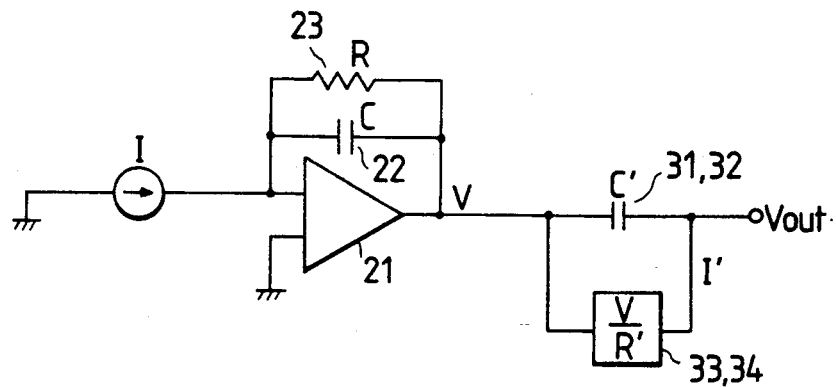
FIG. 4 is a simple equivalent circuit diagram showing the integrator of FIG. 1.

A relationship between the input current and the output voltage of the integrator thus constructed will be described with reference to FIG. 4. In the figure, I designates a sensor current flowing through the sensor 100; V, an output voltage of the first circuit 2; C, capacitance of the integrating capacitor 22; R, resistance of the feedback resistor 23; C', capacitance of each of the capacitors 31 and 32 in the second circuit; and $V_{out}$, an output voltage of the second circuit 3. In the circuit, the following equations are satisfied:

$$V = (1/C)\int (I - V/R)dt$$

$$V_{out} = (1/C)\int Idt - (1/CR)\int Vdt + (1/C)\int I'dt$$

In the above equation, in order to make the output voltage $V_{out}$ equal to the result of integrating the input current I, the sum of the second and third terms must be zero. The constant current source produces the current I' substantially proportional to the input voltage V. Accordingly, if the internal resistance of the constant current source is R', then $$V/CR = I'/C' = V/C'R'$$

If $CR = C'R'$.

$$V_{out} = (1/C)\int Idt.$$

The equation shows that the output voltage $V_{out}$ is equal to a result of the integration of the input current I. This implies that the circuit can be operated as a perfect integrator.

Figure 9:
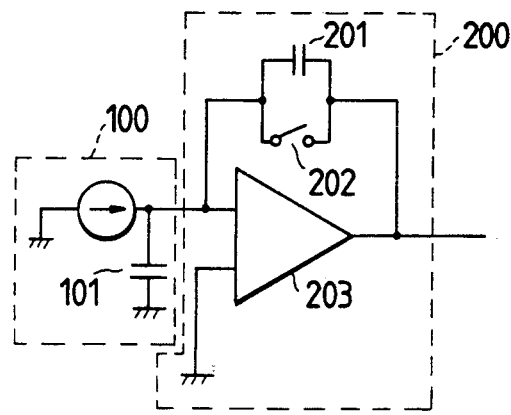
FIGS. 9 and 10 are equivalent circuit diagrams showing conventional integrators.
Figure 10:
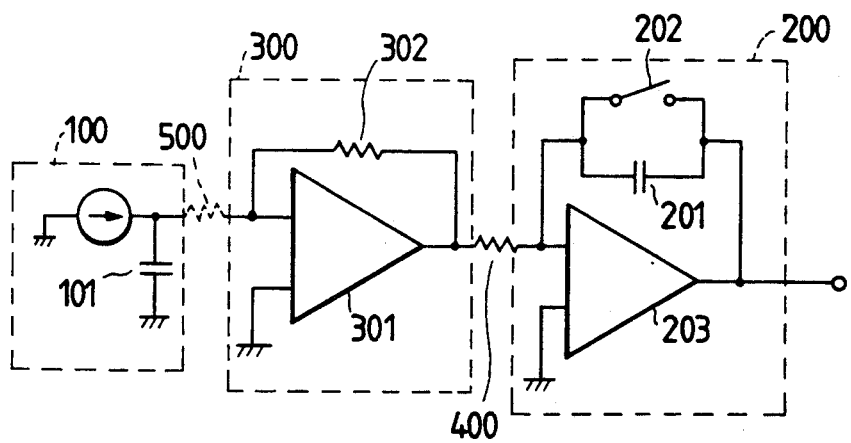

In the integrator 1 thus constructed, the integrating capacitor 22 is discharged by the feedback resistor 23. Thus, there is no need for the analog switch 202 causing noise, which is indispensable for the conventional integrator shown in FIG. 9. Further, since the integrating capacitor 202 is contained in the feedback loop, if a capacitive element such as the sensor 100 is connected to the input terminal of the integrator, no phase delay takes place. Therefore, there is no need for the resistor 500 for preventing the oscillation which is indispensable for the conventional integrator shown in FIG. 10. Further, the integrator according to the embodiment is free from the problem of the conventional system that the CR as the product of the resistor 500 and the sensor output capacitance 101 makes the image read speed slow. Additionally, a high through-rate is not required because the integration is performed in high frequencies.

In the second circuit 3, the first ends of the capacitors 31 and 32 are driven by the output signal of the first circuit 2. The constant current sources 33 and 34, connected to the second ends of the capacitors 31 and 32, compensate for a leak component caused by the feedback resistor 23. A signal representative of the result of integrating the input current I appears at the output terminals. After the integration is completed, the capacitors 31 and 32 are reset by the reset switches 35 and 36, so that the charge left therein are perfectly removed. Then, the integrator starts the integrating operation again. Since the integrating operation and the resetting operation are alternately performed by the pair of compensating circuits, the second circuit 3 is always placed to the integration mode, with no waste of time. Theoretically, the read speed can be increased up to the frequency that is determined by a period of time from an instant that the reset switches 35 and 36 are turned on to earth the second ends of the capacitors 31 and 32 till the switches are next turned off.

In this embodiment, a couple of compensating circuits in the second circuit 3 are alternately operated. Where a high speed operation is not required, a single compensating circuit may be used, which consists of a capacitor, a constant current source, and a reset switch.

Figure 5:
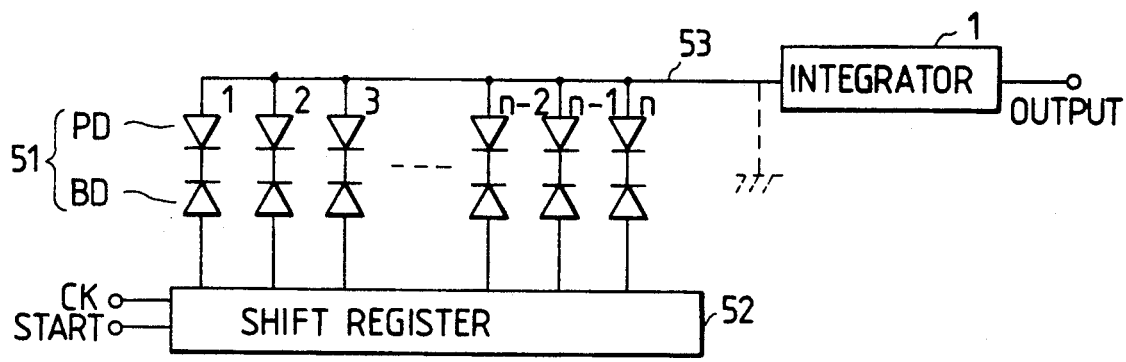
FIG. 5 is an equivalent circuit diagram showing an image read device using the integrator.

An image read device can be constructed by connecting the sensor 100 to the input terminal of the integrator 1. The sensor 100 may be constructed with a thin-film structure such that a semiconductor layer made of amorphous silicon is sandwiched by two electrodes, e.g., a metal electrode and a transparent electrode. The sensor 100 may be electrically expressed by an equivalent circuit as shown in FIG. 5. In FIG. 5, each photocell 51 consists of a photodiode PD and a blocking diode BD connected in back to-back fashion. A plurality of the photocells are arrayed side by side to form a linear sensor array. The anodes of those blocking diodes BD is connected to the terminals of a shift register 52. The anodes of the photodiode PD are connected to a common electrode 53, which is connected to the integrator 1 (more exactly, the inverting input terminal of the operational amplifier 21).

The operation of the image read device thus constructed will be descried. The shift register 52 successively applies a signal to the blocking diodes BD of the photocells 51 of the linear sensor array, and charges the photodiodes PD inversely biased. During one cycle of scan, the photodiodes PD are illuminated with light, and produce amount of charge according to the amount of illuminated light. Then, the shift register 52 successively applies a read pulse to the sensor array, thereby charging again the photodiodes PD with the amount of charge equal to the discharge amount. Sensor current I caused at the time of recharging operation flows through the common electrode 53 to the integrator 1. Through the integration of this current, voltage signals produced from the respective photodiodes PD are time-sequentially detected.

If the input capacitance of the integrator 1 (input gate capacitance of the JFET at the input portion of the operational amplifier 21) is set to be approximately equal to that of the sensor output capacitor 101, generation of random noise can be minimized.

Figure 6:
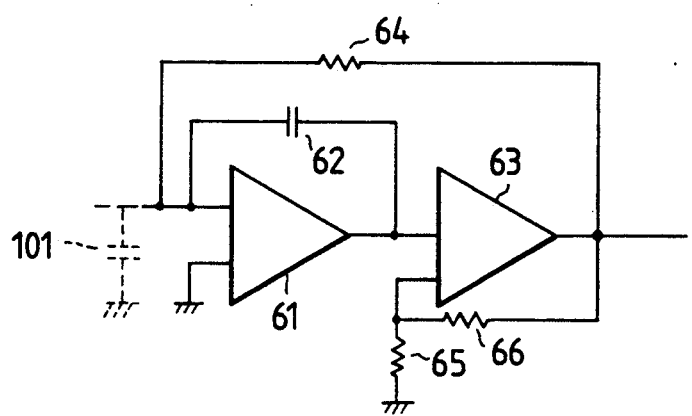
FIGS. 6 and 7 are equivalent circuit diagrams showing other examples of the first circuit of FIG. 1.

FIG. 6 is a circuit diagram showing another example of the first circuit. The first circuit used in the embodiment of FIG. 1, which uses one operational amplifier 21, has the following problems. It is difficult to amplify the minute charge from the sensor to a necessary voltage. The capacitance of the integrating capacitor 22 is approximately 0.1 pF, smaller than the internal capacitance and wire capacitance of the IC. This makes the circuit design difficult. The first circuit of FIG. 6 solves those problems.

In FIG. 6, the first circuit 2 located at the prestage in FIG. 1 embodiment is constituted by a perfect integrator 61 including an integrating capacitor 62 in its negative feedback portion, a non-inverting amplifier 63 for amplifying the output signal of the perfect integrator 61, and a feedback resistor 64 inserted between the output side of the non-inverting amplifier 63 and the input side of the perfect integrator 61. The voltage divided by resistors 65 and 66 is applied to the input terminal of the non-inverting amplifier 63. The feedback resistor 64 functions to leak the capacitor 62 by the output of the non-inverting amplifier 63. Such a construction of the first circuit allows use of bipolar elements, since the impedance is reduced by virtue of the non-inverting amplifier 63. Accordingly, all the elements (including analog switches) except for the JFET of the perfect integrator 61 may be bipolar elements, facilitating monolithic fabrication of the integrator 1.

In the instant first circuit, if the gain of the non-inverting amplifier 63 is 100 times, for example, the capacitance of the integrating capacitor 62 is 10 pF (=0.1 pF ×100) for the integrating operation equal to that of the circuit shown in FIG. 1. Also in low frequencies, or the current-to-voltage converting mode, the offset of the amplifier is not amplified.

However, in the first circuit, the resistance of the feedback resistor 64 must also be increased 100 times as that of the feedback resistor 23. If the sensor is connected to the input terminal of the first circuit, the sensor output capacitor 101 creates a phase delay, possibly causing the integrator to oscillate.

Figure 7:
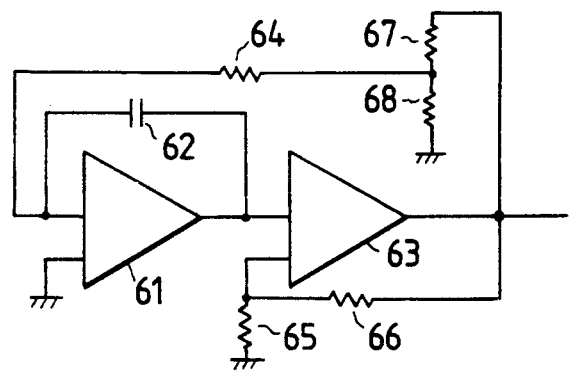
Figure 8:
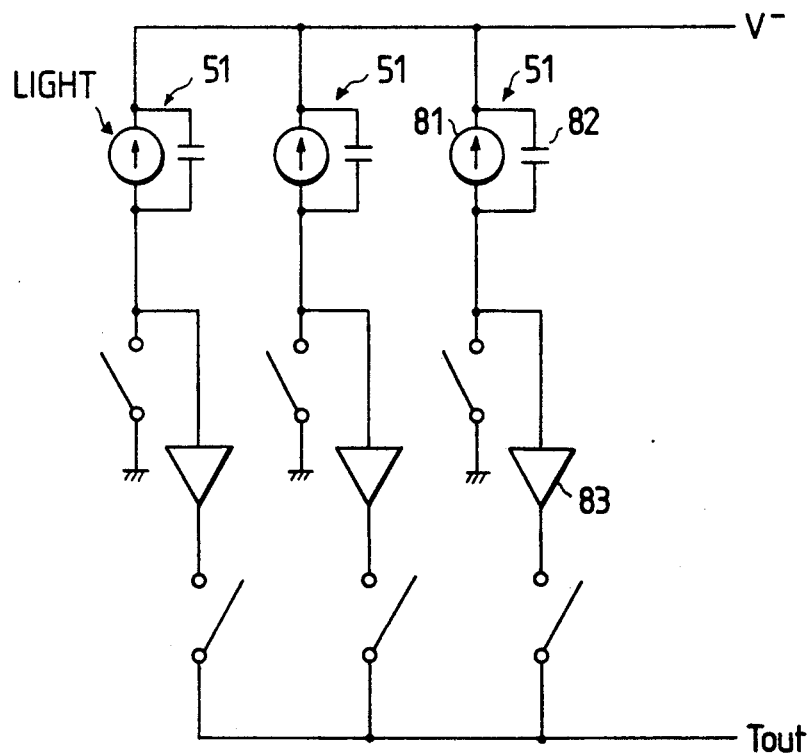
FIG. 8 is a simple equivalent circuit diagram showing a conventional image read device.

Turning now to FIG. 7, there is shown still another example of the first circuit which solves the problems of the first circuit of FIG. 6, and is suitable for the connection with a sensor having a large sensor output capacitance 101.

In the instant first circuit, a series circuit of resistors 67 and 68 is connected to the output terminal of the non-inverting amplifier 63. One end of the resistor 68 is earthed. A node between the resistors 67 and 68 is connected to the feedback resistor 64. The remaining construction of the first circuit is the same as that of the first circuit of FIG. 6.

Since the instant first circuit is thus constructed, if the resistances of the resistors 67 and 68 are selected so as to satisfy the relation 9 : 1, the voltage applied to the feedback resistor 64 may be reduced 1/10 times as high as the output voltage, and consequently the resistance of the feedback resistor 64 may be reduced to be 1/10 when compared with that in FIG. 6. Accordingly, if the capacitive element (sensor) is connected to the input terminal of the integrator, the oscillation owing to the phase delay will not occur as well as the ringing and overshoot.

In each of the integrators as mentioned above, the parallel circuit of the integrating capacitor 22 (62) and the feedback resistor 23 (64) is contained in the feedback loop. The first circuit 2 having such a feedback loop operates as an integrator in high frequencies and as a current-voltage converter in low frequencies. The second circuit 3 compensates for the leak by the feedback resistor 23 (64). Accordingly, lo the integrator produces a value representative of the result of integrating the input current (sensor current). In the conversion of the minute charge into the voltage, high S/N performance is secured.

The image read device incorporating the integrator having the sensor at its input terminal produces an output image signal with high tone reproductivity.

In the above description of the image read devices, the sensor was used which has the thin film structure made of amorphous silicon. The integrator of the invention may be coupled with other types of sensors, such as a MOS image sensor using MOS switches for switching the currents of the photodiodes, a CdS sensor based on the photoconduction, and an a-Si sensor. When coupled with any of those sensors, the integrator is improved in crosstalk and linearity performances.

The integrator of the invention can secure a high S/N ratio in converting the minute charge signal to the voltage. Accordingly, the integrator may be used as a minute current detector.

Since the image read device uses the high S/N ratio integrator, the device can produce an image signal with high tone reproductivity, and can pick up image data at high speed.

What is claimed is:
1. An integrator comprising:
a first circuit including an integrating capacitor and a feedback resistor, both being connected in parallel to each other in a negative feedback loop of said first circuit; and a second circuit, connected to an output side of said first circuit, for compensating for a leak by said feedback resistor.

2. The integrator according to claim 1, wherein said first circuit is an amplifier of which the feedback portion includes a parallel circuit consisting of an integrating capacitor and a feedback resistor.

3. The integrator according to claim 1, wherein said first circuit comprises:

a first amplifier of which the feedback portion includes an integrating capacitor;

a second amplifier for amplifying an output voltage of said first amplifier; and a feedback resistor connected between an output side of said second amplifier and an input side of said first amplifier.

4. The integrator according to claim 1, wherein two compensating circuits are connected in parallel to the output side of said first circuit, and are alternately operated.

5. The integrator according to claim 1, wherein said second circuit comprises:

a capacitor of which one end is connected to the output side of said first circuit and the other end is used as an output terminal;

a constant current source, connected to the other end of said capacitor, for producing a current substantially proportional to an output voltage of said first circuit; and a reset switch connected to the other end of said capacitor.

6. An image read device comprising:

a sensor with a current mode output;

a first circuit connected to said sensor, including an integrating capacitor and a feedback resistor, both being connected in parallel to each other in a negative feedback loop of said first circuit; and a second circuit, connected to an output side of said first circuit, for compensating for a leak by said feedback resistor.

* * * * *